H. STUKART.
SHARPENING DEVICE FOR KNIVES OF MEAT SLICING MACHINES.
APPLICATION FILED JUNE 12, 1912.
1,039,210.
Patented Sept. 24, 1912.
2 SHEETS—SHEET 1.
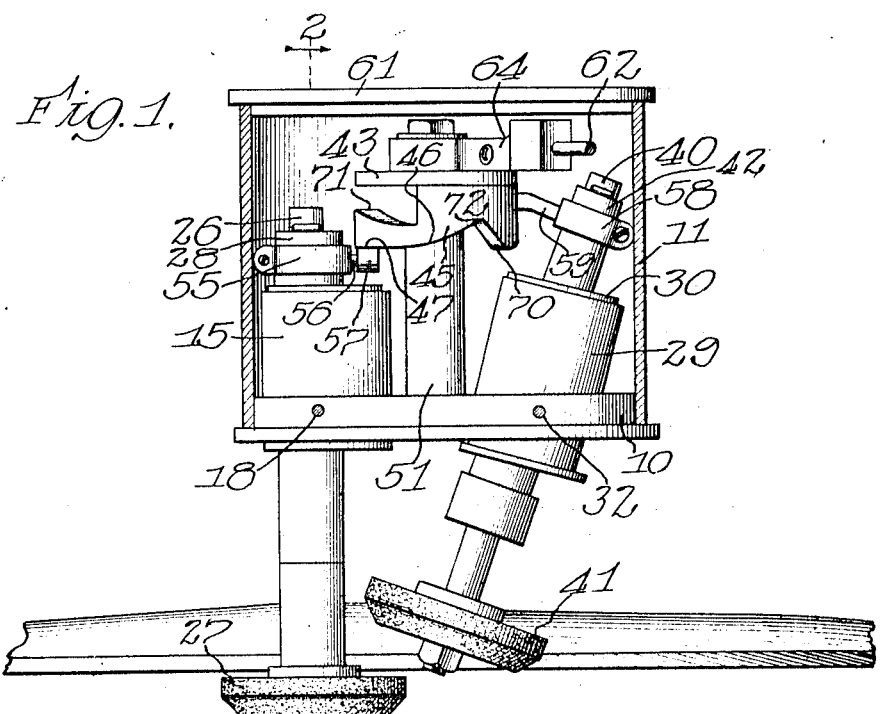
Witnesses:
Inventor:
Hendrik Stukart
By Brown & Hopkins
Attys H. STUKART.
SHARPENING DEVICE FOR KNIVES OF MEAT SLICING MACHINES.
APPLICATION FILED JUNE 12, 1912.
1,039,210.
Patented Sept. 24, 1912.
2 SHEETS—SHEET 2.
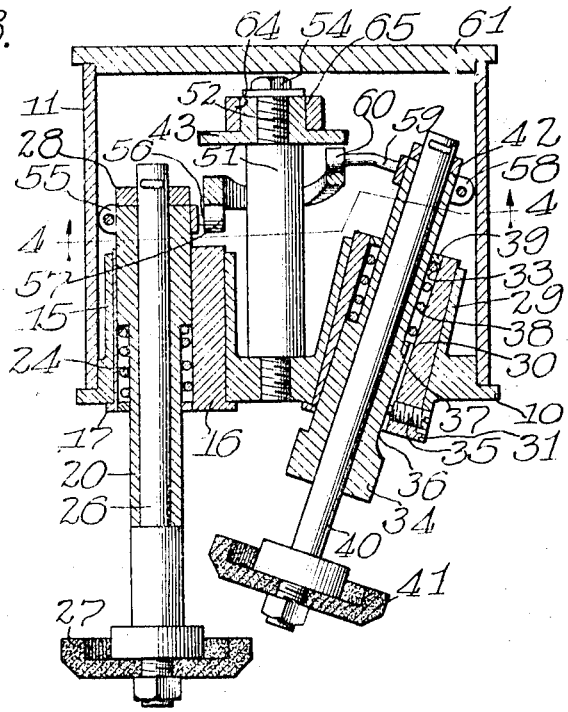
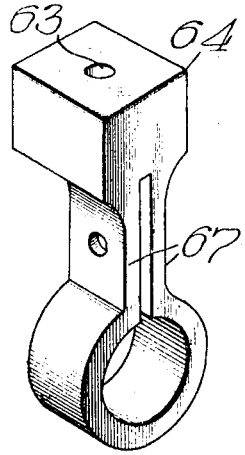
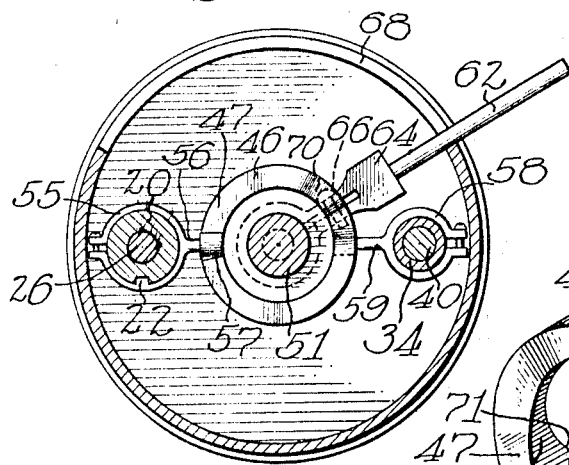
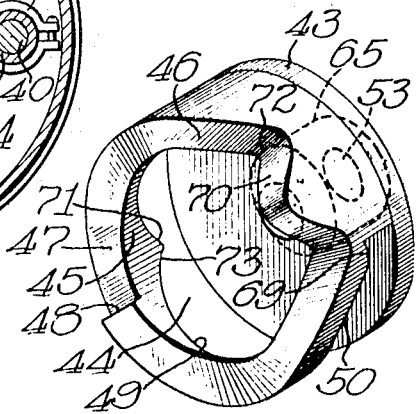
Witnesses:
G. W. Omarus Jr.
R. Bauerle
Inventor:
Hendrik Stukart
By Brown & Hopkins
Attys

UNITED STATES PATENT OFFICE.

HENDRIK STUKART, OF ROTTERDAM, NETHERLANDS, ASSIGNOR TO U. S. SLICING MACHINE COMPANY, OF CHICAGO, ILLINOIS, A CORPORATION OF ILLINOIS.

SHARPENING DEVICE FOR KNIVES OF MEAT-SLICING MACHINES.

1,039,210.  Specification of Letters Patent.  Patented Sept. 24, 1912.

Application filed June 12, 1912. Serial No. 703,136.

*To all whom it may concern:*

Be it known that I, HENDRIK STUKART, a subject of the Ruler of the Netherlands, residing at Rotterdam, in the Kingdom of the Netherlands, have invented certain new and useful Improvements in Sharpening Devices for Knives of Meat-Slicing Machines, of which the following is a specification.

This invention relates to improvements in devices for sharpening the rotary circular knives of meat slicing machines and has for its primary object to provide an improved device of this class by means of which the knife may be readily sharpened and when not in use may be readily thrown out of operation or removed from the machines, and which sharpening device embodies rotary sharpeners adapted to engage opposite faces of the knife and adapted to be successively moved into and out of operative position.

A further object is to provide an improved device of this class having means whereby the grinders may be also simultaneously moved into and out of engagement with the knife.

To the attainment of these ends and the accomplishment of other new and useful objects, as will appear, the invention consists in the features of novelty in substantially the construction, combination and arrangement of the several parts hereinafter more fully described and claimed, and shown in the accompanying drawings illustrating the invention, and in which:

Figure 1 is a top plan view of an improved device of this class constructed in accordance with the principles of this invention, having a part of the inclosing casing in section; Fig. 2 is a sectional view on line 2—2, Fig. 1; Fig. 3 is a horizontal sectional view; Fig. 4 is a sectional view on line 4—4, Fig. 3; Fig. 5 is a perspective view of a detail; Fig. 6 is a perspective view of the controlling cam.

The rotary circular knives of meat slicing machines, especially the type with which this present invention is adapted to be used, are provided with a bevel face and a flat face; the flat face of the knife is arranged adjacent the meat being cut. In sharpening these knives, they are sharpened on one side to a greater extent than on the other, that is to say, the bevel side of the knife requires the most sharpening and it is only necessary to sharpen the flat side of the knife just enough to remove the bur or the wire edge which is formed by sharpening the bevel face. It has been found in practice that better results can be obtained if the grinder is not brought into action on the flat side of the knife until just before the completion of the grinding of the bevel face and in order to accomplish this the present invention has been designed so that the grinders may be moved successively into engagement with the respective knife faces, the grinder acting on the bevel face being moved into engagement with that face in advance of the other grinder and held in engagement with its face of the knife until the face is nearly ground, at which time the other grinder may be moved into engagement with its respective face of the knife. Controlling means is provided for accomplishing this operation and in the event that it is desired to simultaneously move both of the grinders into engagement with the knife, for any reason, the controlling means by a further manipulation is adapted to perform this operation. The form of the invention best adapted for these operations comprises a supporting member designated generally by the reference numeral 10, which may be constructed of any suitable material and is of any desired size and configuration. This supporting member has connected with it a housing or casing 11 within which all of the operating parts of the mechanism, save the grinders, and a portion of their spindles are located, and the supporting member and casing 11 are adjustably held in position with respect to the knife 12 in any desired or suitable manner, such as by means of a spindle 13 secured to the casing and which spindle has adjustable engagement with a support or socket 14.

The supporting member 10 is provided with an aperture therethrough of circular diameter and surrounding the aperture so as to project into the casing 11 is a bearing 15, which may be of any desired length. Within this bearing is arranged a bushing 16 having a flange 17 at one end and is of a length to substantially fill the bearing, as shown more clearly in Fig. 3, in which bearing the bushing is rotatably mounted. Any suitable fastening device, such as a set screw 18 (see more particularly Fig. 2) is provided for locking the bushing against rotation. The aperture through the supporting member 10 and the opening in the bearing 15 is inclined slightly to the horizontal for a purpose to be set forth. The bushing 16 is provided with an opening 19 therethrough which is arranged eccentrically and passing through this eccentric opening is a sleeve 20 which is held against rotation with respect to the bushing 16 in any suitable manner, such as by means of a screw or lug 21 entering a groove 22 in the sleeve. The sleeve is provided with a reduced portion to form a shoulder 23 which is located within the bushing and an elastic member 24, such as a coil spring or the like, surrounds the reduced portion of the sleeve within the bushing so that one end rests against the shoulder 23 and the other against a shoulder 25 formed in any suitable manner. Rotatably mounted in this sleeve 20 is a spindle 26, to one end of which is connected a grinder 27 adapted to act on the flat face of the knife 12. The spindle is held against longitudinal displacement with respect to the sleeve in any suitable manner, preferably by means of a collar 28 secured to the end of the spindle to abut the end of the sleeve. The elastic member 24 acts upon the sleeve 20 in such a manner that it tends normally to draw the grinder 27 against the flat face of the knife. By the provision of the eccentric bushing, it will be manifest that when the bushing is released, it may be rotated in its bearing and the eccentric nature of the mounting of the spindle of the grinder 27 will cause the grinder to be raised or lowered by this adjustment of the bushing to properly present the grinder to the knife. The inclined position of the aperture through which the bushing passes and of the bearing 15 also serves as a means whereby the proper adjustment of this grinder is obtained. The supporting member 10 is also provided with another aperture, preferably arranged in horizontal alinement with the first recited aperture and this aperture is provided with a bearing 29 surrounding the aperture and projecting into the casing 10. The aperture and the bearing 29 extend through the supporting member 10 at an angle preferably at about 105 degrees to the face of the supporting member. A bushing 30 similar to the bushing 16 is arranged in this aperture and bearing and is provided with a flange 31 which abuts the end of the aperture. This bushing 30 is of a length to substantially fill the bearing 29 and is held against rotation in the bearing in any suitable manner, such as by means of a fastening screw 32 (see Fig. 1). This bushing 30 is also provided with an aperture 33 passing therethrough and at an angle to the face of the support and also at a different angle with respect to the angle of the bearing. The angle of inclination of the opening 23 in the bushing with respect to the face plate is preferably about 120 degrees, as shown more clearly in Fig. 3. A sleeve 34 is provided and extends through the opening 33. This sleeve is held against rotation with respect to the bushing 30 by means of a fastening device 35 which projects into a groove 36 in the sleeve. The sleeve is provided with a reduced portion forming a shoulder 37, and an elastic member 38, such as a coil spring, surrounds the reduced portion of the sleeve with one end resting against the shoulder and the other end resting against a stop 39 on the bushing. A spindle 40 is rotatably mounted in the sleeve and has connected at one end a grinder 41 which is preferably beveled, as shown, and is adapted to act on the bevel face of the knife. The spindle is held against longitudinal displacement with respect to the sleeve 34 in any suitable manner, such as by means of a collar 42. The spring 30 is such that its normal tendency is to move the grinder 41 toward the knife and both of the springs 24, 30 serve as the means for holding the grinders in engagement with the respective faces of the knife. In order that these grinders may be successively moved into and out of engagement with the respective faces of the knife, a controller is provided for moving the grinders against the stress of the respective elastic members. This controlling mechanism comprises a cam device which will now be described.

The cam, designated generally by the reference numeral 43 in Fig. 6, is provided with a body having a slot designated generally by the reference numeral 44 to form a portion spaced from the body. One face of this portion operates to control one of the grinders while the other face operates to control the other grinder. The outermost face of the portion 45 is provided with an inclined portion 46 terminating in a substantially horizontal portion 47 at the end of which horizontal portion is arranged a stop 48. The other face of the portion 45 is provided with a substantially horizontal portion 49 arranged adjacent the horizontal portion 47 and an inclined portion 50 arranged adjacent the inclined portion 46. The portions 46, 47 of the cam operate to control the movement of the grinder 47 while the faces 49, 50 operate to control the movements of the grinder 41. This is accomplished in the following manner.

The cam member 43 is rotatably supported within the casing 11 in any desired or suitable manner, preferably by means of a spindle 51 secured to the supporting member 10 and projecting into the casing. This spindle is provided with a reduced portion 52 which enters an aperture 53 in the cam member and a nut 54 is threaded on to the extremity of the reduced portion 52 to lock the cam against accidental displacement.

Secured to the sleeve 20 of the grinder 27 is an adjustable collar 55, preferably of the spring clamp type, which is provided with a spindle 56, on which is mounted an anti-friction roller 57 which engages and rides over the faces 46, 47 of the cam and is also adapted to engage the shoulder 48 to arrest the rotation of the cam in one direction. A similar collar 58 is connected with the sleeve 34 on the grinder 41 and is provided with a spindle 59, mounted to which is an anti-friction roller 60. This anti-friction roller projects into the space between the member 45 and the body 43 to operate on the faces 49, 50 of the cam. These anti-friction rollers are thus adjustably connected to the respective sleeves so that they may be properly positioned to engage the respective cam faces when the respective bushings are adjusted in their bearings. It has already been stated how the vertical adjustment of the grinder is obtained by rotating the bushing 16 in its bearing. The bushing 30, when rotated, however, gives a different adjustment to the grinder 41 and owing to the angularity of the opening in which the bushing 30 is mounted, with respect to the face of the supporting member 10, and the angularity of the opening 33 through the bushing with respect to the bearing 29 and the face plate, it will be manifest that by the rotation of the bushing 30 in its bearing, the grinder 41 may be universally adjusted. If the anti-friction rollers 57, 60 were not adjustably secured to the respective sleeves, it will be manifest that they would be moved out of operative position with respect to the faces of the cam.

A closure 61 is provided for the casing 11 so that all of the parts are completely housed to prevent unauthorized interference with the operating mechanism and the cam is adapted to be rotated from the outside of the housing by means of a suitable handle 62 removably engaging in an aperture 63 in a clip 64, adjustably secured to a hub 65 on the cam body 43. This clip 64 is preferably of the spring type and is adapted to be clamped on the hub by means of a suitable screw or clamping device 66, passing through spring portions 67 of the clamp. Thus, it will be manifest that the clip 64 may be readily adjusted to properly position it on the cam. The handle 62 passes through a suitable slot 68 in the casing. If desired, the casing may be provided with graduation marks (not shown) with which the handle coöperates to indicate the position of the cam.

The inclined faces 46, 50 of the cam are located adjacent each other while the substantially horizontal faces 47, 49 are also located adjacent each other.

When the parts are in the position shown in Fig. 1, the grinders are held out of engagement with the respective faces of the knife and the anti-friction roller 57 of the grinder 27 will be in engagement with the substantially horizontal portion 47 of the cam, while the anti-friction roller 60 of the grinder 41 will be in engagement with a stop 69 (see Fig. 6) at the bottom of the inclined face 50.

Assuming now that it is desired to sharpen the knife, the operator grasps the handle 62 and moves it from the position shown in Fig. 1 to the left in said figure. As soon as the cam begins to rotate the shoulder 69 will move away from the anti-friction roller 60, causing the inclined face 50 to move into engagement with the roller. As the cam is rotated further in the same direction, the inclined face 50 will move over the anti-friction roller 60 and the elastic member 38 will force the grinder 41 into engagement with the bevel face of the knife. During this portion of the movement of the cam, the substantially horizontal face 47 of the cam member 45 will move over the anti-friction roller 47 and the grinder 27 will be held against lateral movement. When the grinder 41 engages the knife the parts are allowed to remain in this position until the grinding is nearly completed, at which time the cam is rotated further in the same direction. This will cause the substantially horizontal face 49 of the cam member to move over the anti-friction roller 60 while at the same time the inclined face 46 of the cam will move over the anti-friction roller 57, thereby allowing the elastic member 24 to draw the grinder 27 back against the flat face of the knife. During this operation the grinder 41 will be held against lateral adjustment as the horizontal face 49 will hold it against movement. Thus it will be manifest that the grinders are successively moved into engagement with the knife. When it is desired to move them out of engagement with the knife, the handle 62 is moved to rotate the cam in the opposite direction, and they will likewise successively be moved out of engagement with the knife. This operation is accomplished because when one of the inclined faces 46, 50 is operating upon their respective anti-friction rollers 57, 60, one of the substantially horizontal portions 47, 49 will be operating upon the other anti-friction roller so that when one grinder is being laterally adjusted, the other will be held against lateral adjustment. This device is also adapted to move the grinders laterally and simultaneously into and out of engagement with the knife. In order to accomplish this, there is provided another cam portion 70 which projects beyond the outer face of the cam member 45 and is arranged at the extremities of the inclined portions 46, 50, and a corresponding cam 71 projects from the inner face of the cam member 47 and is disposed opposite to the cam portion 70.

These cam portions 70, 71 are adapted to act upon the respective anti-friction rollers 57, 60 simultaneously and are brought into operation by a still further rotation of the cam member 43 in the same direction that it was rotated to move the grinders laterally into engagement with the knife. Just as the grinders assume this position, the anti-friction roller 57 will be in engagement with the shoulder 72 formed between the cam 70 and the inclined face 60, and the anti-friction roller 60 will be in engagement with the shoulder 73 formed in the base of the cam portion 71 and the inclined portion 49. A further rotation of the cam will then force the grinder 27 and the grinder 41 away from the knife simultaneously until the anti-friction rollers pass over the respective cams 70, 71 to the other side thereof, and during the movement of these anti-friction rollers to these other sides of the cam portions 70, 71, the grinders will be simultaneously moved into engagement with the knife. Obviously the cam member 43 may be adjusted to this position where the cam portions 70, 71 will operate upon the respective anti-friction rollers and by a limited oscillating movement of the handle 62 the grinders will then be simultaneously moved into and out of engagement with the knife. If, however, it is desired to employ the sharpeners in the manner first set forth, the cam portions 70, 71 are moved out of positions in which they will operate on the anti-friction rollers and any position of the cam may be readily ascertained by an inspection of the handle 62 with respect to the indications on the casing 11. Thus, it will be manifest that this device is adapted to move the grinders successively into and out of engagement with the knife and can also be employed for moving them simultaneously into and out of engagement with the knife, although the latter operation is not necessary for the successful operation of the device.

While the preferred form of the invention is herein shown and described, it is to be understood that many changes may be made in the details of construction and arrangement of the parts, within the scope of the claims, without departing from the spirit of this invention.

What is claimed as new is:

1. In a device for sharpening the rotary circular knife of a slicing machine, the combination of a sharpener for the front of the knife, a sharpener for the back of the knife, and cam means for successively moving the sharpeners into engagement with the respective faces of the knife.

2. In a device for sharpening the rotary circular knife of a slicing machine, the combination of a rotatable sharpener for the front of the knife, a rotatable sharpener for the back of the knife, and means for successively controlling the movements of the sharpeners into engagement with the respective faces of the knife, said sharpeners being rotatable by the engagement of the knife therewith.

3. In a device for sharpening the rotary circular knife of a slicing machine, the combination of a sharpener for acting on the back of the knife, a sharpener for acting on the face of the knife, means for moving the sharpeners into engagement with the knife and means common to the sharpeners for successively controlling such movement.

4. In a device for sharpening the rotary circular knife of a slicing machine, the combination of a sharpener movable into and out of engagement with the back of the knife, a sharpener movable into and out of engagement with the front of the knife, and means common to the sharpeners for successively controlling such movements.

5. In a device for sharpening the rotary circular knife of a slicing machine, the combination of a sharpener movable into and out of engagement with the back of the knife, a sharpener movable into and out of engagement with the front of the knife, and means common to the sharpeners for causing the sharpeners to move independently.

6. In a device for sharpening the rotary circular knife of a slicing machine, the combination of a sharpener movable into and out of engagement with the back of the knife, a sharpener movable into and out of engagement with the front of the knife, and means for causing such movements to be successive.

7. In a device for sharpening the rotary circular knife of a slicing machine, the combination of a sharpener movable into and out of engagement with the back of the knife, a sharpener movable into and out of engagement with the front of the knife, cam means common to the sharpeners for successively controlling such movements, said sharpeners being rotatable by the engagement of the knife therewith.

8. In a device for sharpening the rotary circular knife of a slicing machine, the combination of a sharpener adapted to act on one face of the knife, a sharpener adapted to act on the other face of the knife, and means for causing the sharpeners to be moved successively into engagement with the respective faces of the knife, said sharpeners being rotatable by frictional engagement of the knife therewith.

9. In a device for sharpening the rotary circular knife of a slicing machine, the combination of a sharpener adapted to act on one face of the knife, a sharpener adapted to act on the other face of the knife, and a cam device for controlling both sharpeners for causing the sharpeners to be moved successively into engagement with the respective faces of the knife.

10. In a device for sharpening the rotary circular knife of a slicing machine, the combination of a sharpener adapted to act on one face of the knife, a sharpener adapted to act on the other face of the knife, and means for causing the sharpeners to be moved toward each other and successively into engagement with the respective faces of the knife, said sharpeners being rotatable by the frictional engagement of the knife therewith.

11. In a device for sharpening the rotary circular knife of a slicing machine, the combination of a sharpener for acting on one face of the knife, a sharpener for acting on the other face of the knife, said sharpeners being movable toward each other and into engagement with the respective faces of the knife, and away from each other and out of engagement with the knife, spring means for imparting one of such movements and positive means for imparting the other of such movements, said positive means causing an independent and successive movement of the grinders.

12. In a device for sharpening the rotary circular knife of a slicing machine, the combination of a sharpener for acting on one face of the knife, a sharpener for acting on the other face of the knife, said sharpeners being movable toward each other and into engagement with the respective faces of the knife, and away from each other and out of engagement with the knife, spring means for imparting one of such movements and cam means for imparting the other of such movements, said cam means causing an independent and successive movement of the grinders.

13. In a device for sharpening the rotary circular knife of a slicing machine, the combination of a rotary sharpener for acting on one face of the knife, a rotary sharpener for acting on the other face of the knife, said sharpeners being movable toward each other and into engagement with the respective faces of the knife, and away from each other and out of engagement with the knife, spring means for imparting one of such movements and positive means for imparting the other of such movements, said positive means causing an independent and successive movement of the grinders.

14. In a device for sharpening the rotary circular knife of a slicing machine, the combination of a rotary sharpener adapted to act on the back of the knife, a rotary sharpener adapted to act on the front of the knife, said sharpeners being laterally movable into engagement with the respective faces of the knife, and controlling means common to the sharpeners for causing such movement to be successive.

15. In a device for sharpening the rotary circular knife of a slicing machine, the combination of a rotary sharpener adapted to act on the back of the knife, a rotary sharpener adapted to act on the front of the knife, said sharpeners being laterally movable into engagement with the respective faces of the knife, and a cam device for causing such lateral movements of the sharpeners to be successive and independent with respect to each other.

16. In a device for sharpening the rotary circular knife of a slicing machine, the combination of a rotary sharpener adapted to act on the back of the knife, a rotary sharpener adapted to act on the front of the knife, said sharpeners being laterally movable into engagement with the respective faces of the knife, and a controlling means common to the sharpeners for causing one of the sharpeners to be moved into engagement with the knife in advance of the other sharpener.

17. In a device for sharpening the rotary circular knife of a slicing machine, the combination of a rotary sharpener adapted to act on the back of the knife, a rotary sharpener adapted to act on the front of the knife, said sharpeners being laterally movable into engagement with the respective faces of the knife, and controlling means common to the sharpeners for causing the movement of one sharpener to be independent of the movement of the other sharpener.

18. In a device for sharpening the rotary circular knife of a slicing machine, the combination of a rotary sharpener adapted to act on the back of the knife, a rotary sharpener adapted to act on the front of the knife, said sharpeners being laterally movable into engagement with the respective faces of the knife, and a cam device for causing the movement of one of the sharpeners to be independent of the other sharpener, said sharpeners being rotatable by the engagement of the knife therewith.

19. In a device for sharpening the rotary circular knife of a slicing machine, the combination of a sharpener movable into and out of engagement with the back of the knife, a sharpener movable into and out of engagement with the face of the knife, a controlling means for controlling such movements of the sharpeners and for causing such movements to be successive, a housing for the controlling means and an operating handle extending to the outside of the housing.

20. In a device for sharpening the rotary knife of a slicing machine, the combination of a sharpener for the back of the knife, a sharpener for the front of the knife, a support for the sharpeners, means for causing the sharpeners to be moved into and out of engagement with the respective faces of the knife, and means whereby one of the sharpeners may be universally adjusted with respect to the support.

21. In a device for sharpening the rotary knife of a slicing machine, the combination of a sharpener for the back of the knife, a sharpener for the front of the knife, a support for the sharpeners, means for causing the sharpeners to be moved into and out of engagement with the respective faces of the knife, means whereby one of the sharpeners may be universally adjusted with respect to the support, and means whereby the other sharpener may be adjusted upwardly and downwardly with respect to the support and knife.

22. In a device for sharpening the rotary knife of a slicing machine, the combination of a sharpener for one face of the knife, a sharpener for the back of the knife, a support for the sharpeners, a bearing in the support for one of the sharpeners for supporting the journal of the sharpener in a downward inclination, means whereby said sharpener may be adjusted in an upright plane, a bearing in the support for the other sharpener, means whereby the last said bearing may be adjusted to impart a universal adjustment to the last said sharpener, and means for moving the sharpeners into and out of engagement with the face of the knife and with relation to their respective bearings.

23. In a device for sharpening the rotary circular knife of a slicing machine, the combination of a support, a substantially horizontal bearing in the support arranged at an angle to the support other than ninety degrees, a bushing arranged in the bearing and having a journal opening therethrough, for the spindle of the sharpener, said journal opening being also substantially horizontal and arranged at an angle other than ninety degrees to the support, and also at a different angle with respect to the angle of the bearing, said bushing being adjustable in the bearing for imparting a universal adjustment to the sharpener.

24. In a device for sharpening the rotary circular knife of a slicing machine, the combination of a support, a substantially horizontal bearing in the support arranged at an angle to the support other than ninety degrees, a bushing arranged in the bearing and having a journal opening therethrough, for the spindle of the sharpener, said journal opening being also substantially horizontal and arranged at an angle other than ninety degrees to the support, and also at a different angle with respect to the angle of the bearing, said bushing being rotatable in the bearing for imparting a universal adjustment to the sharpener.

25. In a device for sharpening the rotary circular knife of a slicing machine, the combination of a sharpener for the back of the knife, a sharpener for the face of the knife, means for causing the sharpeners to be successively moved into and out of engagement with the respective faces of the knife, and means whereby the last said means will also cause the sharpeners to be simultaneously moved into and out of engagement with the knife.

26. In a device for sharpening the rotary circular knife of a slicing machine, the combination of a sharpener for the back of the knife, a sharpener for the face of the knife, a cam device for causing the sharpeners to be successively moved into and out of engagement with the respective faces of the knife, and means whereby the said cam device will also cause the sharpeners to be simultaneously moved into and out of engagement with the knife.

27. In a device for sharpening the rotary circular knife of a slicing machine, the combination of a sharpener for the back of the knife, a sharpener for the front of the knife, controlling means for the sharpeners for causing them to be moved successively into and out of engagement with the respective faces of the knife during a portion of the movement of said controlling means, and means whereby the controlling means will cause the sharpeners to be simultaneously moved into and out of engagement with the knife during another portion of the movement of the controlling means.

28. In a device for sharpening the rotary circular knife of a slicing machine, the combination of a sharpener for the back of the knife, a sharpener for the front of the knife, a cam device for the sharpeners for causing them to be moved successively into and out of engagement with the respective faces of the knife during a portion of the movement of said cam device, and means whereby the cam device will cause the sharpeners to be simultaneously moved into and out of engagement with the knife during another portion of the movement of the cam device.

29. In a device for sharpening the rotary circular knife of a slicing machine, the combination of a grinder to act on the back of the knife, a grinder to act on the front of the knife, and means for moving the grinders into and out of engagement with the respective faces of the knife, said means operating to cause such movement of the grinders to be successive.

30. In a device for sharpening the rotary circular knife of a slicing machine, the combination of a grinder to act on the back of the knife, a grinder to act on the front of the knife, and means for moving the grinders into and out of engagement with the respective faces of the knife, said means operating to cause such movement of the grinders to be successive, said means being also adapted to operate to cause such movements of the grinders to be simultaneous.

In testimony whereof I have signed my name to this specification, in the presence of two subscribing witnesses, on this 10th day of June A. D. 1912.

HENDRIK STUKART.

Witnesses:
J. H. JOCHUM, Jr.,
CHARLES H. SEEM.